United States Patent
Porte

(10) Patent No.: US 6,241,189 B1
(45) Date of Patent: Jun. 5, 2001

(54) PROTECTIVE DEVICE FOR A JET ENGINE AIR INLET COWL EQUIPPED WITH A DEICING SYSTEM

(75) Inventor: Alain Porte, Colomiers (FR)

(73) Assignee: Aerospatiale Societe Nationale Industrielle, Paris (FR)

( * ) Notice: Subject to any disclaimer, the term of this patent is extended or adjusted under 35 U.S.C. 154(b) by 0 days.

(21) Appl. No.: 09/190,104

(22) Filed: Nov. 12, 1998

(30) Foreign Application Priority Data

Nov. 21, 1997 (FR) .................................................. 97 14610

(51) Int. Cl.[7] .................................................. B64D 15/00
(52) U.S. Cl. .......................................................... 244/134 B
(58) Field of Search .............................. 244/134 B, 53 B, 244/134 R, 207, 210, 129.4, 129.5

(56) References Cited

U.S. PATENT DOCUMENTS

| | | | |
|---|---|---|---|
| 2,425,630 | * 8/1947 | McCollum | 244/134 R |
| 4,674,714 | 6/1987 | Cole et al. | 244/134 B |
| 4,757,963 | 7/1988 | Cole | 244/134 B |
| 5,099,869 | 3/1992 | Derouet et al. | 137/70 |
| 5,400,984 | * 3/1995 | Arnold et al. | 244/134 B |
| 5,743,488 | * 4/1998 | Rolston et al. | 244/53 B |
| 5,934,611 | * 8/1999 | Tindell et al. | 244/53 B |
| 6,131,855 | * 10/2000 | Porte | 244/134 B |

FOREIGN PATENT DOCUMENTS

| | | | |
|---|---|---|---|
| 0178144 | 4/1986 | (EP) | 244/134 B |
| 0205283 | 12/1986 | (EP) | 244/134 B |
| 0430801 | 6/1991 | (EP) | 244/134 B |
| 536089 | * 4/1994 | (EP) | 244/134 B |
| 986878 | * 3/1965 | (GB) | 244/134 B |
| 2259679 | * 3/1993 | (GB) | 244/134 B |

OTHER PUBLICATIONS

Engineering Notes, Novel Nacelle Thermal Anti–icing Exhaust Grill for Enhanced Mixing, Gillan et al, pp. 811–813, Dec. 1997.*

* cited by examiner

Primary Examiner—Peter M. Poon
Assistant Examiner—Jeffrey L. Gellner
(74) Attorney, Agent, or Firm—Fisher, Christen & Sabol

(57) ABSTRACT

The present invention relates to an air inlet cowl (9) for a jet engine, the leading edge (16) of which is hollow and supplied with hot air for deicing by a pipe (10) and an injector (12). According to the invention, the pipe (10) and the connector (12A) to the injector (12) are enclosed in an internal casing (27) which isolates them from heat-sensitive structures (26). The volume (28) inside the internal casing (27) communicates, on the one hand, with the outside through an orifice (34) and, on the other hand, through an orifice (35) with the peripheral annular space (22) which surrounds the engine fan and which is equipped with a vent door (23).

10 Claims, 5 Drawing Sheets

PROTECTIVE DEVICE FOR A JET ENGINE AIR INLET COWL EQUIPPED WITH A DEICING SYSTEM

The present invention relates to the deicing of air inlet cowls of jet engines, particularly aircraft engines.

It is known that, if need be (to prevent the formation of ice or remove ice that has already formed), the leading edge of the air inlet cowl of such engines is deiced by heating with pressurized hot air tapped from said engine and conveyed to said leading edge by a hot air circulation circuit.

To this end, such an air inlet cowl comprises:
  a hollow leading edge delimiting an internal peripheral chamber closed by a first internal partition (or frame) and equipped with at least one orifice placing said internal chamber in communication with the outside; and
  a pipe which can be connected, at its rear end away from said leading edge and passing through a second internal partition, to said pressurized hot air circulation circuit and, at its front end toward the leading edge, to an injector injecting said pressurized hot air into said internal chamber.

The pressurized hot air tapped from the engine is at a high temperature, for example of the order of 400° C., which means that said pipe radiates heat and that the nearby structures in said air inlet cowl which are sensitive to heat (for example the acoustic panels which are made of a composite material) need to be protected against the heat. Furthermore, for obvious safety reasons, it is also necessary to provide some protection for said nearby structures, in case pressurized hot air should leak or said pipe should burst.

In the current state of the art, there are essentially three known methods for protecting said structures near to the pipe that conveys the hot air for deicing. These are:
  first of all, protection by spraying a coating of thermally-insulating foam or paint onto said temperature-sensitive structures. Such protection is, of course, restricted to the surfaces coated. For this reason, the thermally-insulating coating needs to be sprayed either over all of the components inside the air inlet cowl, which increases their mass and has the risk of making inspections and repairs difficult, or onto just that part of said components which are in the immediate vicinity of said pipe, the consequence of this being that the unprotected components do not age well under the effect of the heat and often need repair. Furthermore, given the limited life of such thermally-insulating coatings, the protection they afford is only temporary and frequent periodic inspections, which are difficult to conduct because of the poor accessibility to the inside of said air inlet cowl, have to be performed. Finally, for safety reasons, it is necessary to provide in said cowl a device for detecting the bursting of the pipe, such as a vent door, this device having to be specially attached to the deicing cowl;
  or, a double-wall protection. However, given the complications involved in producing double walls around pipe connections, such protection is often limited to the pipes themselves. This then results in a thermal protection which is either very partial, or complicated, costly and cumbersome. However, even if the connections are produced as double-walled connections, heat is still radiated toward the sensitive structures, because no heat energy is taken away. Finally, here too, safety requires there to be a device for specially detecting that the pipe has burst;
  or, alternatively, as described in document EP-A-0 205 283, a protection using an enclosing metal structure which also serves to remove the deicing air leaving the peripheral chamber inside the leading edge. However, the temperature, which is still high (about 200° C.) of the deicing air leaving the leading edge, causes excessive radiation of the heat from the enclosing metal structure to said nearby structures. Furthermore, a device for detecting that said pipe has burst is very difficult if not impossible to install, even though it is essential to safety, because of the shape and design of such a protection.

The object of the present invention is to overcome these drawbacks.

To this end, according to the invention, the air inlet cowl for a jet engine especially for an aircraft, said air inlet cowl being equipped with means for deicing its leading edge and comprising, for this purpose:
  a hollow leading edge delimiting an internal peripheral chamber closed by a first internal partition and equipped with at least one orifice placing said internal chamber in communication with the outside; and
  a pipe which can be connected, at its rear end away from said leading edge and passing through a second internal partition, to a pressurized hot air circuit and, at its front end toward said leading edge, to an injector injecting said pressurized hot air into said internal chamber,
is noteworthy in that it comprises:
  an internal casing cooperating with said first and second internal partitions and with the internal face of the external wall of said cowl to delimit a volume enclosing said pipe;
  at least one orifice for letting air into said volume; and
  at least one orifice for extracting air from said volume.

Thus, by virtue of the present invention, said internal casing, which is continuous and integral, allows the nearby structures to be protected against the radiation of heat and leaks of pressurized hot air and against said pipe exploding. The pipe, with its connections and flanges, is isolated from the rest of the inside of the air inlet cowl. By virtue of the air inlet and outlet orifices, the inside of the casing is permanently ventilated, and this limits the amount of heat radiated by it. The heat-sensitive nearby structures are thus protected from any temperaturelinked deterioration or aging.

All the parts that make up said internal casing, which have a specific function and are located in and limited to the precise environment that needs to be protected, can be made of metal or of any other fire-resistant material, without this having too unfavorable an influence on the mass of said air inlet cowl. Thus, the present invention makes it possible to provide solutions to all the problems encountered in engine air inlet cowls, as far as the following are concerned:
  resistance to high temperatures; and
  ease of repair and inspection; indeed, by making the way in which said casing is mounted in said air inlet cowl removable, the parts that make up the thermal protection and the nearby parts (structure and systems) can be inspected.

In order to further increase this ease of repair and inspection, it is advantageous that, at the same end as the wall of said cowl, said internal casing should be fixed to a part of said wall that forms a removable panel.

Furthermore, in order to tolerate the thermal expansions and the relative movements, it is preferable that, at least at one of its ends, said internal casing should rest against the corresponding internal partition via an elastic seal.

One of said ventilation orifices may be made in said external wall of said air inlet cowl, near to said internal partition.

When the engine is of the bypass type and has a peripheral annular space delimited between said engine and its lateral cowling, in the region of the engine fan, it is advantageous that another of said ventilation orifices should be made in said second internal partition so as to place said volume and said peripheral annular space in communication. Thus, should said pipe burst, the pressurized hot air can be evacuated toward said peripheral annular space and the resulting rise in pressure is detected by the vent door, generally provided in this peripheral annular space. It is not therefore necessary to provide an overpressure detector specific to the air inlet cowl deicing system.

Of course, said ventilation orifices are calibrated in such a way that in normal operation (that is to say when said pipe has not burst), said casing is appropriately ventilated. This ventilation may be from the first internal partition toward the second or alternatively from said second internal partition toward the first.

The figures of the appended drawing will make it readily understood how the invention may be achieved. In these figures, identical references denote similar components.

Figure 1:
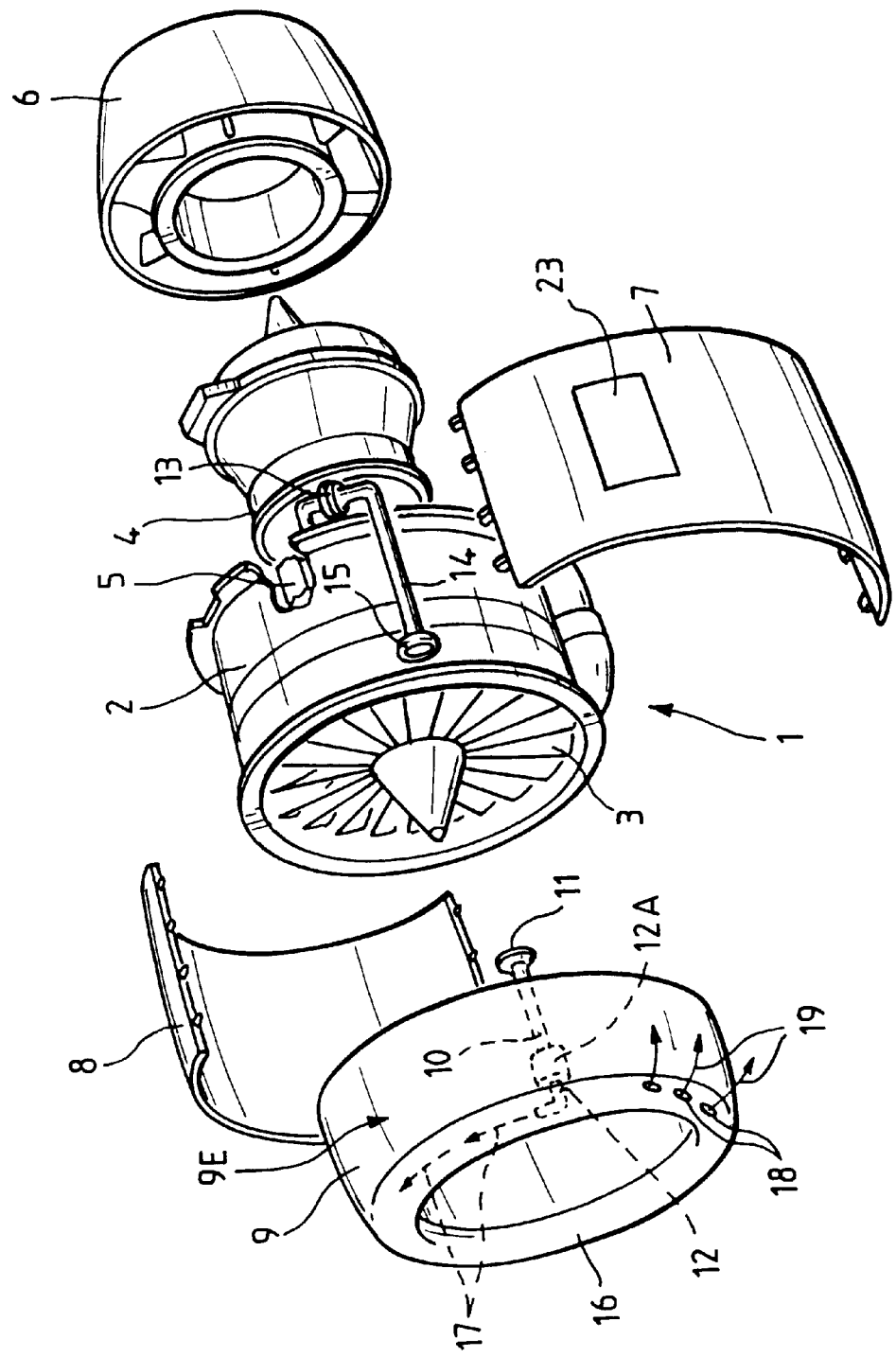
FIG. 1 shows, in exploded perspective, an aircraft jet engine and its various cowlings.

The bypass engine 1 depicted diagrammatically in FIG. 1 comprises, in the known way, a central hot air generator 2, a fan 3 and compressor stages 4 and is equipped with a hanger 5 for hanging it from a support mast (not depicted). Associated with and fixed to the engine 1 are a jet pipe assembly 6, two lateral cowls 7 and 8 and an air inlet cowl 9.

As illustrated diagrammatically in FIG. 1, the air inlet cowl 9 comprises an internal pipe 10 provided, at its rear end that faces toward the engine 1, with a connector element 11 and, at its front end, housed in the hollow leading edge 16 of said air inlet cowl, with an injector 12 equipped with a connector 12A. Furthermore, arranged on a compressor stage of the engine 1 is a pressurized hot air tapping 13 which is connected to a pipe 14 equipped, facing the connector element 11 of the pipe 10, with a complementary connector element (15).

Thus, when the complementary connector elements 11 and 15 are connected together, pressurized hot air tapped at 13 from the engine 1 is conveyed via the pipes 14 and 10 as far as the injector 12. The latter can therefore blow this pressurized hot air (broken-line arrows 17) inside the leading edge 16 in order to deice it. Orifices 18 are provided for discharging to the open air (arrows 19) hot air which has flowed inside the leading edge 16.

Figure 2:
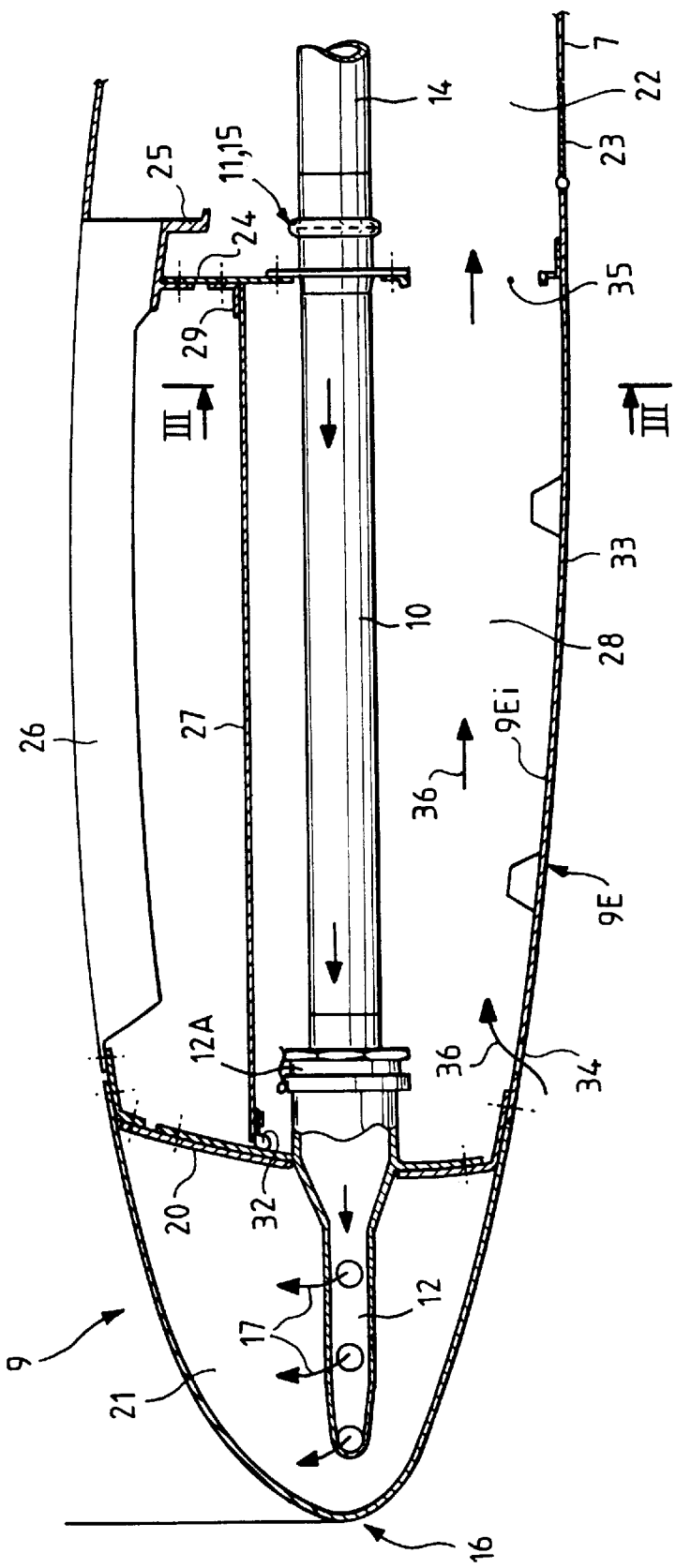
FIG. 2 is an enlarged radial half section of one embodiment of the air inlet cowl of said engine, illustrating the means of deicing said cowl.
Figure 3:
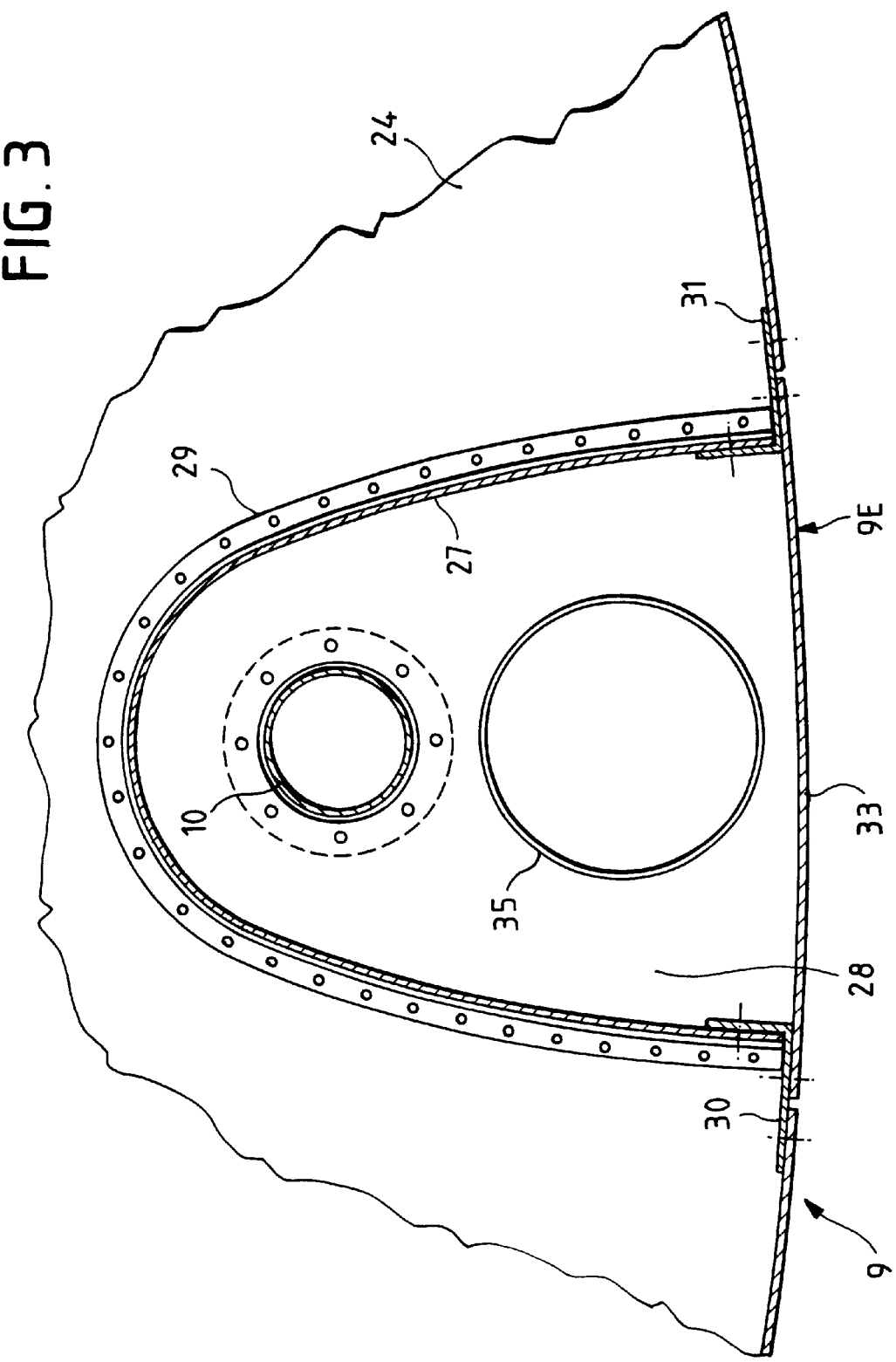
FIG. 3 is a partial and enlarged transverse section on III—III in FIG. 2.
Figure 4:
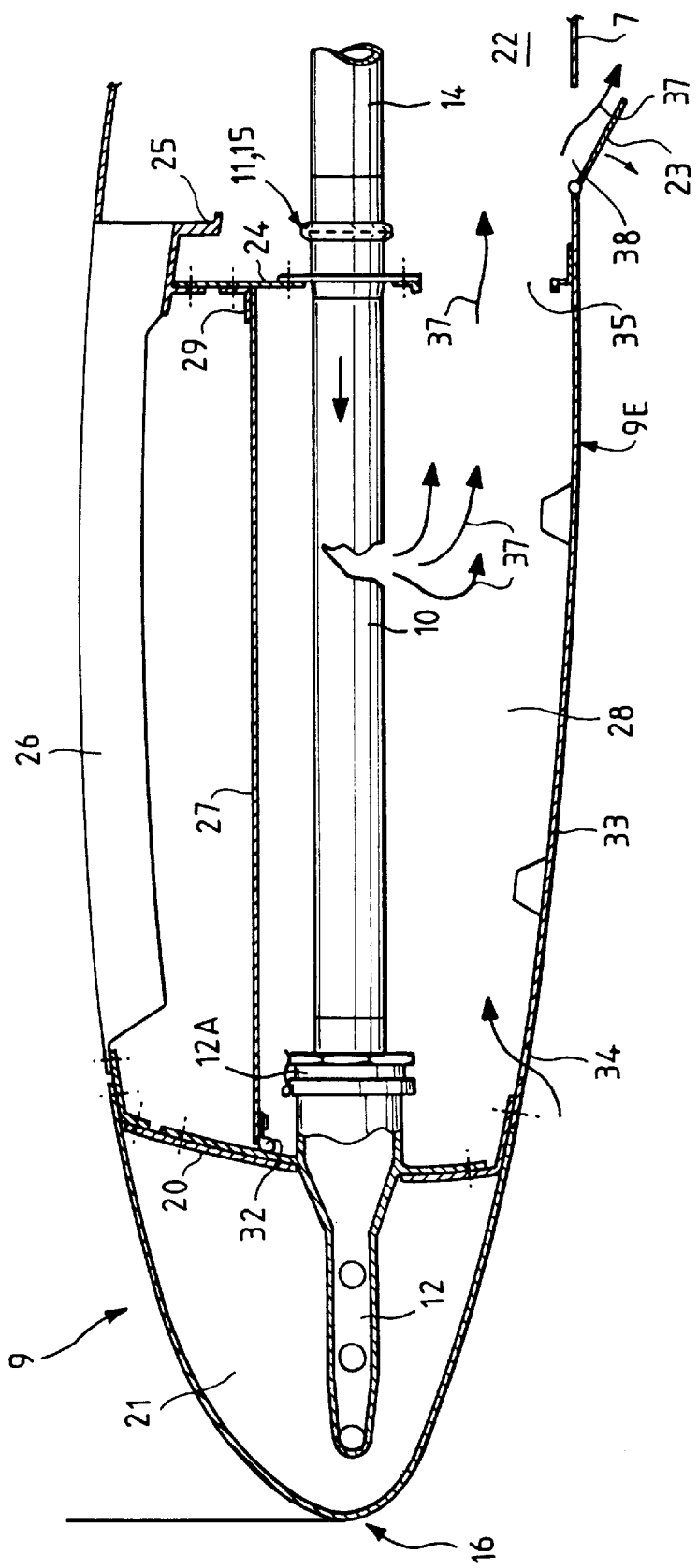
FIG. 4 is a radial half section similar to the one of FIG. 2, illustrating the eventuality of the pressurized hot air pipe bursting.

As shown in detail and to a larger scale in the radial half section of FIG. 2, the hollow leading edge 16 is closed at the rear end by an internal partition 20, which means that an annular peripheral chamber 21 is formed inside said leading edge 16. The injector 12 passes through said internal partition 20 in a leaktight manner and is fixed thereto. It can therefore inject pressurized hot air into the chamber 21. The orifices 18 allow said chamber 21 to be placed in communication with the outside.

When the lateral cowls 7 and 8 are assembled to the central generator 2, they delimit therewith, in the region of the fan 3, a peripheral annular space 22 (see FIG. 2) in which there can be found the pressurized hot air pipe 14, together with other pipes of this type (not depicted). Also, for safety reasons, there is in these lateral cowls 7 and 8 a safety door 23, which opens automatically in the event of a raised pressure in said peripheral annular space 22, for example once the pipe 14 has burst.

Furthermore, the rear end of the pipe 10—the opposite end to the injector 12—passes through another partition 24 closing the rear end of the cowl 9 in the vicinity of the frame 25 via which said cowl is mounted on the engine 1. This rear end of the pipe 10 is furthermore fixed to said partition 24. Thus, the pipe 10 and the connection 12A are contained between the two partitions 20 and 24, as are other structures, such as, for example, an acoustic panel 26. Such an acoustic panel 26 is made of a composite material, for example of the honeycomb type, and is sensitive to heat. It may therefore be destroyed or damaged by the heat radiated by the pipe 10 or by any leaks of pressurized hot air conveyed by this pipe or, alternatively, if said pipe 10 should burst, by the pressurized hot air escaping from this pipe.

So, according to the invention, in order to overcome these drawbacks, there is provided an internal casing 27 cooperating with the partitions 20 and 24 and with the internal face 9Ei of the external wall 9E of the cowl to delimit a volume 28 enclosing the pipe 10 and the connector 12A and isolating them from the heat-sensitive structures 26.

In the example depicted in FIGS. 2 to 5, the internal casing 27 has the shape of an inverted trough and is fixed removably to the partitions 20 and 24 and to the external wall 9E of the cowl 9. In this example, the internal casing 27 is fixed to the partition 24 and to the external wall 9E of the cowl 9 by brackets 29, 30 and 31, respectively. In addition, in order to be able to adapt to the thermal expansions and vibrations, the joint between the front edge of the casing 27 and the partition 20 is achieved via a resting elastic seal 32.

To make the internal casing 27 more readily removable, it is advantageous for that part of the external wall 9E to which it is fixed to consist of a panel 33 which can itself be removed.

Furthermore, the volume 28 enclosing the pipe 10 and the connection 12A is in communication:

with the outside via an orifice 34 made near to the partition 20, in the external wall 9E (panel 33), and with the peripheral annular space 22 via an orifice 35 made in the partition 24.

Thus, in normal operation (see FIG. 2), ventilation air symbolized by the arrows 36 can enter the volume 28 via the orifice 34 and take away the heat energy radiated by the pipe 10 toward the peripheral annular space 22 through the orifice 35. In addition, should the pipe 10 burst (see FIG. 4 and the arrows 37 which symbolize this bursting), the pressurized hot air is immediately sent into said peripheral annular space 22 via the orifice 35. Of course, this orifice is calibrated in such a way that the raised pressure that is the result of the pipe 10 bursting cannot damage the internal casing 27. In addition, this raised pressure causes the pressure door 23 to open and the hot air can escape to the outside through the opening 38 of this door in the cowl 7. After such opening, the pressure door 23 remains open, which lets an operator inspecting the outside of the engine 1 know that such a raised pressure has occurred.

Figure 5:
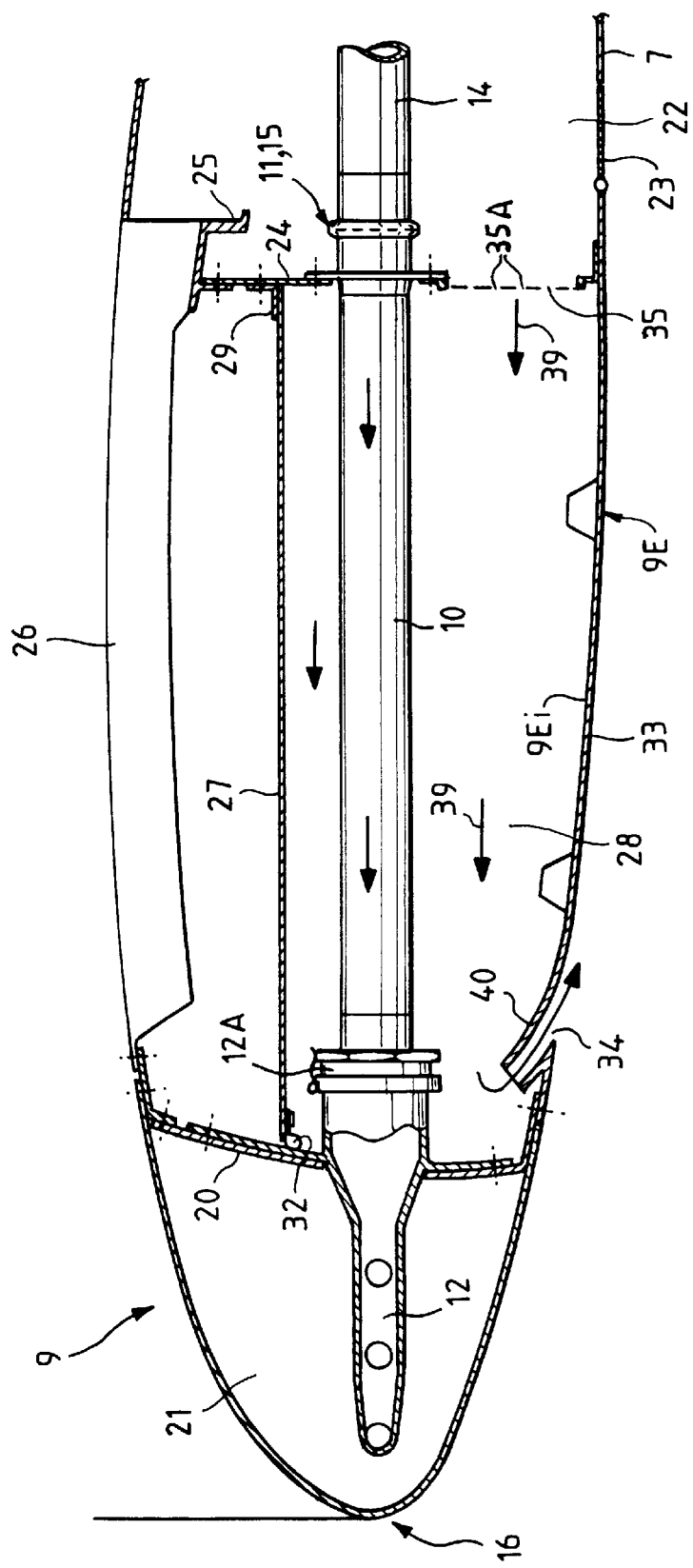
FIG. 5 shows, in a view similar to FIG. 2, an alternative way of ventilating the protective casing in accordance with the present invention.

FIG. 5 illustrates the ventilation of the pipe 10 in normal operation, in the opposite direction to the direction illustrated in FIG. 2. It can be seen that this ventilation, illustrated by the arrows 39, runs from the peripheral annular space 22 toward the outside, passing through the orifices 35 and 34. The latter orifice 34 may be equipped with a scoop 40 which projects, toward the inside or the outside of the volume 28, to improve the ventilation of the pipe 10. Should the pipe 10 burst, the way in which the device of FIG. 5 operates is identical to the way described with reference to FIG. 4.

Of course, more generally, the orifice 34 may be equipped with a grid or slit system allowing air to pass through but preventing the passage of a flame, in order to meet international regulations on this subject. Likewise, the orifice 35 may consist of a great many small orifices 35A allowing air to pass through them but behaving like a flame-arrester grid preventing a flame originating in the peripheral annular space 22 from passing through the internal partition 24 (see FIG. 5). For similar reasons, the casing 27 and its accessories 29, 30, 31 and 32 are made of flame-resistant materials, particularly metallic materials.

What is claimed is:

1. An air inlet cowl (9) for a jet engine (1) especially for an aircraft, said air inlet cowl (9) having an external wall (9E) with an internal face (9Ei) and being equipped with means for deicing its leading edge, and comprising:

a hollow leading edge (16) delimiting an internal peripheral chamber (21) closed by a first internal partition (20) and equipped with at least one orifice (18) placing said internal chamber (21) in communication with the outside;

a pipe (10) which can be connected, at its rear end away from said leading edge (16) and passing through a second internal partition (24), to a pressurized hot air circuit (14) and, at its front end toward said leading edge (16), to an injector (12) injecting said hot air into said internal chamber (21), said injected hot air being evacuated from said internal chamber (21) through said orifice (18) in said internal chamber (21); and heat sensitive structures (26) disposed between said first and second internal partitions (20 and 24), said air inlet cowl (9) further comprising:

an internal casing (27) disposed between said first and second internal partitions (20 and 24) and delimiting with said internal partitions and with said internal face (9Ei) a volume (28) enclosing said pipe (10), said internal casing (27) protecting said heat sensitive structures (26) against the heat radiated by said pipe (10), against the leaks of pressurized hot air from said pipe (10) and against said pipe exploding; and at least one inlet orifice (34 or 35) for letting air into said volume (28) and at least one outlet orifice (35 or 34) for extracting air from said volume (28), said volume (28) being in communication with the outside via at least one of said orifices, so that said volume (28) is permanently ventilated by ventilation air (36) taking away the heat radiated by said pipe (10).

2. The air inlet cowl as claimed in claim 1, wherein said internal casing (27) is mounted removably.

3. The air inlet cowl as claimed in claim 1, wherein, at the same end as the wall (9E) of said cowl (9), said internal casing (27) is fixed to a part of said wall that forms a removable panel (33).

4. The air inlet cowl as claimed in claim 1, wherein, at least at one of its ends, said internal casing (27) rests against the first internal partition (20) via an elastic seal (32).

5. The air inlet cowl as claimed in claim 1, for a bypass engine (1) comprising a peripheral annular space (22) delimited between said engine and its lateral cowling (7, 8) in the region of the engine fan (3), said lateral cowling (7, 8) being equipped with a safety door (23) which opens automatically in the event of a raised pressure in said peripheral annular space (22), wherein a second (35) of said orifices is made in said second internal partition (24) so as to place said volume (28) and said peripheral annular space (22) in communication.

6. The air inlet cowl as claimed in claim 5, wherein a second orifice (35) is made up of a great many small orifices (35A) allowing air to pass through them but behaving like a flame-arrester grid preventing a fire originating in the peripheral annular space (22) from passing through said second internal partition (24).

7. The air inlet cowl as claimed in claim 1, wherein a first (34) of said orifices is made in said external wall (9E) of said cowl (9) near to said first internal partition (20).

8. The air inlet cowl as claimed in claim 7, wherein, in said volume (28), ventilation air (36) flows from the first orifice (34) toward a second orifice (35).

9. The air inlet cowl as claimed in claim 7, wherein, in said volume (28), ventilation air (39) flows from the second orifice (35) toward a first (34).

10. The air inlet cowl as claimed in claim 9, wherein said first orifice (34) is extended by a projecting scoop (40).

* * * * *